(12) United States Patent
Yang et al.

(10) Patent No.: US 10,941,750 B2
(45) Date of Patent: Mar. 9, 2021

(54) METHOD, SYSTEM AND APPARATUS FOR OPERATING A HYDRAULIC TURBINE

(71) Applicant: ABB Schweiz AG, Baden (CH)

(72) Inventors: Xiaobo Yang, Beijing (CN); Chunming Yuan, Beijing (CN); Chao Yang, Beijing (CN)

(73) Assignee: ABB Schweiz AG, Baden (CH)

( * ) Notice: Subject to any disclaimer, the term of this patent is extended or adjusted under 35 U.S.C. 154(b) by 69 days.

(21) Appl. No.: 15/999,607

(22) Filed: Aug. 20, 2018

(65) Prior Publication Data

US 2019/0078548 A1 Mar. 14, 2019

Related U.S. Application Data

(63) Continuation of application No. PCT/CN2016/079557, filed on Apr. 18, 2016.

(51) Int. Cl.
*F03B 13/00* (2006.01)
*F03B 13/10* (2006.01)
(Continued)

(52) U.S. Cl.
CPC .......... *F03B 15/08* (2013.01); *F03B 11/006* (2013.01); *F03B 15/18* (2013.01); *F03D 7/0284* (2013.01);
(Continued)

(58) Field of Classification Search
CPC ........ F03B 15/08; F03B 15/18; F03B 11/006; F03D 7/0284; H02P 9/04; H02P 9/06
See application file for complete search history.

(56) References Cited

U.S. PATENT DOCUMENTS 2,914,301 A * 11/1959 Hess .................. F03B 15/18
60/689
4,275,311 A * 6/1981 Agazzone .............. H02H 7/062
290/2
(Continued)

FOREIGN PATENT DOCUMENTS

CN 1312432 A 9/2001
CN 101223358 A 7/2008
(Continued)

OTHER PUBLICATIONS

State Intellectual Property Office of the P.R. China, International Search Report & Written Opinion issued in corresponding Application No. PCT/CN2016/079557, dated Dec. 29, 2016, 12 pp.

(Continued)

*Primary Examiner* — Tulsidas C Patel
*Assistant Examiner* — Thomas K Quigley
(74) *Attorney, Agent, or Firm* — Taft Stettinius & Hollister LLP (57) ABSTRACT

A method, system and apparatus for operating a hydraulic turbine. A speed adjustment quantity for the hydraulic turbine and a corresponding change in flow quantity are obtained. A rotation speed of the hydraulic turbine is adjusted based on the speed adjustment quantity. A change ratio of the flow quantity with regard to the speed adjustment quantity is determined based on the speed adjustment quantity and the corresponding change in flow quantity. An adjustment manner in which the rotation speed is further adjusted is determined based on the determined based on the determined change ratio of flow quantity. An adjustment manner in which the rotation speed is further adjusted is determined based on the determined change ratio of flow quantity. It enables the hydraulic turbine to track a maximum (Continued)

efficiency operation point under a given power order and water head in real time at a low cost.

24 Claims, 6 Drawing Sheets

(51) Int. Cl.
    *F03B 15/08*     (2006.01)
    *H02P 9/04*     (2006.01)
    *H02P 9/06*     (2006.01)
    *F03B 11/00*     (2006.01)
    *F03B 15/18*     (2006.01)
    *F03D 7/02*     (2006.01)

(52) U.S. Cl.
    CPC ............... *H02P 9/04* (2013.01); *H02P 9/06* (2013.01); *F05B 2220/32* (2013.01); *F05B 2240/97* (2013.01); *Y02E 10/20* (2013.01)

(56) References Cited

U.S. PATENT DOCUMENTS

| | | | |
|---|---|---|---|
| 4,467,216 A * | 8/1984 | Murphy | H02J 3/38 290/43 |
| 4,920,277 A | 4/1990 | Kuwabara et al. | |
| 6,336,322 B1 | 1/2002 | Kuwabara et al. | |
| 6,906,432 B2 * | 6/2005 | Belokon | F02C 7/08 290/52 |
| 2014/0197638 A1* | 7/2014 | Kusunoki | H02P 9/007 290/43 |

FOREIGN PATENT DOCUMENTS

| | | |
|---|---|---|
| CN | 102291078 A | 12/2011 |
| CN | 102705151 A | 10/2012 |
| CN | 103306886 A | 9/2013 |
| CN | 103470442 A | 12/2013 |
| CN | 103929106 A | 7/2014 |
| EP | 2343436 A2 | 7/2011 |
| EP | 2980399 A1 | 2/2016 |
| JP | S63287400 A | 11/1988 |

OTHER PUBLICATIONS

The State Intellectual Property Office of P.R. of China, First Office Action in corresponding application No. 201680083150.0, dated Aug. 26, 2019, 10 pp.
The State Intellectual Property Office of P.R. of China, Search Report in corresponding application No. 201680083150.0, dated Aug. 16, 2019, 3 pp.
European Patent Office, Extended European Search Report in corresponding applicatio No. 16898912.7, dated Sep. 17, 2019, 8 pp.
European Patent Office, Communication Pursuant to Article 94(3) EPC issued in corresponding European application No. 16898912.7, dated Mar. 13, 2020, 6 pp.
The State Intellectual Property Office of People's Republic of China, Second Office Action issued in corresponding Chinese application No. 201680083150.0, dated Mar. 4, 2020, 12 pp.
The State Intellectual Property Office of People's Republic of China, Chinese Searcah Report issued in corresponding Chinese application No. 201680083150.0, dated Feb. 25, 2020, 4 pp.
European Patent Office, Communication Pursuant to Article 94(3) EPC issued in corresponding European application No. 16898912.7, dated Oct. 1, 2020, 5 pp.
The State Intellectual Property Office of People's Republic of China, Third Office Action issued in corresponding Chinese application No. 201680083150.0, dated Jul. 29, 2020, 11 pp.
The State Intellectual Property Office of People'S Republic of China, Fourth Office Action issued in corresponding Chinese application No. 201680083150.0, dated Jan. 12, 2021, 10 pages.

* cited by examiner

METHOD, SYSTEM AND APPARATUS FOR OPERATING A HYDRAULIC TURBINE

FIELD OF THE INVENTION

The non-limiting and exemplary embodiments of the present disclosure generally relate to the field of hydraulic electro-generating, and more particularly relate to a method, system and apparatus for operating a hydraulic turbine.

BACKGROUND OF THE INVENTION

This section introduces aspects that may facilitate a better understanding of the disclosure. Accordingly, the statements of this section are to be read in this light and are not to be understood as admissions about what is in the prior art or what is not in the prior art.

Hydraulic turbines and synchronous generators are common devices used in conventional hydropower plants. Hydraulic turbines are designed to run at a speed specified by the power frequency, under a rated hydraulic head and power to drive the synchronous generators. The synchronous are usually operated to match a rated power frequency of integrated alternating current (AC) grid, e.g., 50 Hz or 60 Hz. This means that the design and control of a hydropower plant shall be strictly constrained. Even small deviations of hydraulic head or power order will result in a decrease of efficiency. It was found that if the rotation speed of hydraulic turbine can be adjusted, the efficiency of hydropower generation will be increased significantly. In addition to the significant energy savings, variable speed operation of hydraulic turbine may also increase of the turbine life time, enable wider range of application head and relax the parameter requirement on turbine design.

Nowadays, there are mainly three solutions that realize the variable speed operation of hydraulic turbine. In a first solution, a doubly fed machine operating in a variable speed and constant frequency mode is used to achieve the variable speed operation of the hydraulic turbine. In a second solution, a full power Pulse Width Modulation (PWM) converter is used to allow the variable speed operation of the hydraulic turbine. In a third solution, a converter station in a high voltage direct current system is used to enable the variable speed operation of the hydraulic turbine. In all of the three solutions, the hydraulic turbine generator is connected to an AC system, which is formed either by an AC grid system or by the AC terminals of a converter or converters.

In addition, a Maximum Power Efficiency Tracking (MPET) algorithm was further proposed, which was based on a Hill Chart of hydraulic turbine. The Hill Chart of hydraulic turbine is a chart describing the relationship among flow quantity, rotation speed and efficiency. In the solution, the desired turbine rotation speed n (for maximum efficiency) is determined from the input of power order $P_{ord}$ and water head H according to the Hill Chart curve so that the hydraulic turbine can track the maximum power efficiency. The solution is essentially a look-up table method and the data of the look-up table obtained from the Hill Chart is measured from a down scale turbine model. Thus the computational accuracy of the look-up table method highly depends on how close the characteristic of the real turbine gets to the respective turbine model. However, due to the manufacturing errors, the characteristics of the real turbine usually deviate from the corresponding prototype.

SUMMARY OF THE INVENTION

Various embodiments of the present disclosure mainly aim at providing a solution for operating a hydraulic turbine to solve or at least partially mitigate at least a part of problems in the prior art. Other features and advantages of embodiments of the present disclosure will also be understood from the following description of specific embodiments when read in conjunction with the accompanying drawings, which illustrate, by way of example, the principles of embodiments of the present disclosure.

In an aspect of the present disclosure, there is provided a method of operating a hydraulic turbine. In the method, a speed adjustment quantity for the hydraulic turbine and a corresponding change in flow quantity are obtained, wherein a rotation speed of the hydraulic turbine is adjusted based on the speed adjustment quantity. Based on the speed adjustment quantity and the corresponding change in flow quantity, a change ratio of the flow quantity with regard to the speed adjustment quantity is further determined. Then, an adjustment manner, in which the rotation speed is further adjusted, is determined based on the determined change ratio.

In an embodiment of the present disclosure, the obtaining a corresponding change in flow quantity can comprise obtaining a change of opening angle of a guide vane of the hydraulic turbine, and the determining a change ratio of flow quantity may comprise determining a change ratio of the opening angle of the guide vane with regard to the speed adjustment quantity.

In another embodiment of the present disclosure, the determining an adjustment manner may further comprise any one or more of: determining the adjustment manner as decreasing the rotation speed of the hydraulic turbine in response to the change ratio with a positive value; and determining the adjustment manner as increasing the rotation speed of the hydraulic turbine in response to the change ratio with a negative value.

In a further embodiment of the present disclosure, the method may further comprise: comparing an ordered power for the hydraulic turbine with a power at an absolute maximum efficiency point; wherein the determining an adjustment manner is further based on a result of the comparing.

In a still further embodiment of the present disclosure, the determining the adjustment manner may comprise any one or more of: determining the adjustment manner as decreasing the rotation speed of the hydraulic turbine in response to the change ratio with a positive value and the result showing the ordered power being lower than or equal to the power at the absolute maximum efficiency point; and determining the adjustment manner as increasing the rotation speed of the hydraulic turbine in response to the change ratio with a negative value and the result showing the ordered power being lower than or equal to the power at the absolute maximum efficiency point; determining the adjustment manner as increasing the rotation speed of the hydraulic turbine in response to the change ratio with a positive value and the result showing the ordered power being higher than the power at the absolute maximum efficiency point; and determining the adjustment manner as decreasing the rotation speed of the hydraulic turbine in response to the change ratio with a negative value and the result showing the ordered power being higher than the power at the absolute maximum efficiency point.

In another embodiment of the present disclosure, the method may comprise: determining whether the change ratio of flow quantity falls within a predetermined zone with an upper bound and a lower bound; and terminating the adjustment of the rotation speed if the change ratio flow quantity falls within the predetermined zone.

In a further embodiment of the present disclosure, the method may further comprise: changing a value of the speed adjustment quantity based on the change ratio.

In a still further embodiment of the present disclosure, the method may further comprise: determining an initial rotation speed of the hydraulic turbine based on an ordered power for the hydraulic turbine, a water head, and a look-up table characterizing the relationship among a turbine rotation speed, the water flow quantity, the water head and the turbine efficiency. The adjusting a rotation speed of the hydraulic turbine is performed initially from the initial rotation speed.

According to a second aspect of the present disclosure, there is provided a system of operating a hydraulic turbine. The system may comprise one or more processors; a memory coupled to at least one of the processors; and a set of program instructions stored in the memory. The program instructions is executable by at least one of the processors to cause the system to: obtain a speed adjustment quantity for the hydraulic turbine and a corresponding change in flow quantity, wherein a rotation speed of the hydraulic turbine is adjusted based on the speed adjustment quantity; determine a change ratio of flow quantity with regard to the speed adjustment quantity based on the speed adjustment quantity and the corresponding change in flow quantity; and determine an adjustment manner in which the rotation speed is further adjusted based on the change ratio.

According to a third aspect of the present disclosure, there is provided an apparatus for operating a hydraulic turbine. The apparatus may comprise: an information obtainment module, a change ratio determination module, and an adjustment determination module. The information obtainment module may be configured to obtain a speed adjustment quantity for the hydraulic turbine and a corresponding change in flow quantity, wherein a rotation speed of the hydraulic turbine is adjusted based on the speed adjustment quantity. The change ratio determination module can be configured to determine a change ratio of flow quantity with regard to the speed adjustment quantity based on the speed adjustment quantity and the corresponding change in flow quantity. The adjustment determination module may be configured to determine an adjustment manner in which the rotation speed is further adjusted based on the determined change ratio.

With embodiments of the present disclosure, the rotation speed of the hydraulic turbine is adjusted based on a speed adjustment quantity, the change ratio of the flow quantity with regard to the speed adjustment quantity is monitored and the adjustment manner for the following adjustment is determined based on the determined change ratio. By means of the adjusting and monitoring and further adjusting based on the change ratio, it enables the hydraulic turbine to track a maximum efficiency operation point under a given power order and water head in real time at a low cost.

BRIEF DESCRIPTION OF THE DRAWINGS

The above and other features of the present disclosure will become more apparent through detailed explanation on the embodiments as illustrated in the description with reference to the accompanying drawings, throughout which like reference numbers represent same or similar components and wherein.

DETAILED DESCRIPTION OF EMBODIMENTS

Hereinafter, the principle and spirit of the present disclosure will be described with reference to illustrative embodiments. It shall be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. It will be also understood that the terms "connect(s)," "connecting", "connected", etc. when used herein, just means that there is an electrical connection between two elements and they can be connected either directly or indirectly, unless explicitly stated to the contrary.

In the following description and claims, unless defined otherwise, all technical and scientific terms used herein have the same meaning as commonly understood by one of ordinary skills in the art to which this disclosure belongs. For example, the term "hydraulic turbine" means a water turbine which is a rotary machine that converts kinetic and potential energy of water into mechanical work.

As mentioned hereinabove, in the existing solution, the operation point is determined based on a look-up table method, and its computational accuracy highly depends on the accuracy of turbine prototype which, however, usually deviates from the characteristics of a corresponding real turbine. Therefore, in embodiments of the present disclosure, there is provided a solution for hydraulic turbine operation, which is based on perturb and observe (P&O). In embodiments of the present disclosure, a speed adjustment quantity is exerted onto the hydraulic turbine and a condition of efficiency change is monitored. Based on the condition of efficiency change, a speed adjustment manner for the following speed adjustment is further determined. By means of repetitive monitoring and adjustments, it can enable the hydraulic turbine to track the maximum efficiency operation point under a given power order and water head in real time at a low cost. Hereinafter, specific embodiments of the present disclosure will be described with reference to FIGS. 1 to 10.

Figure 1:
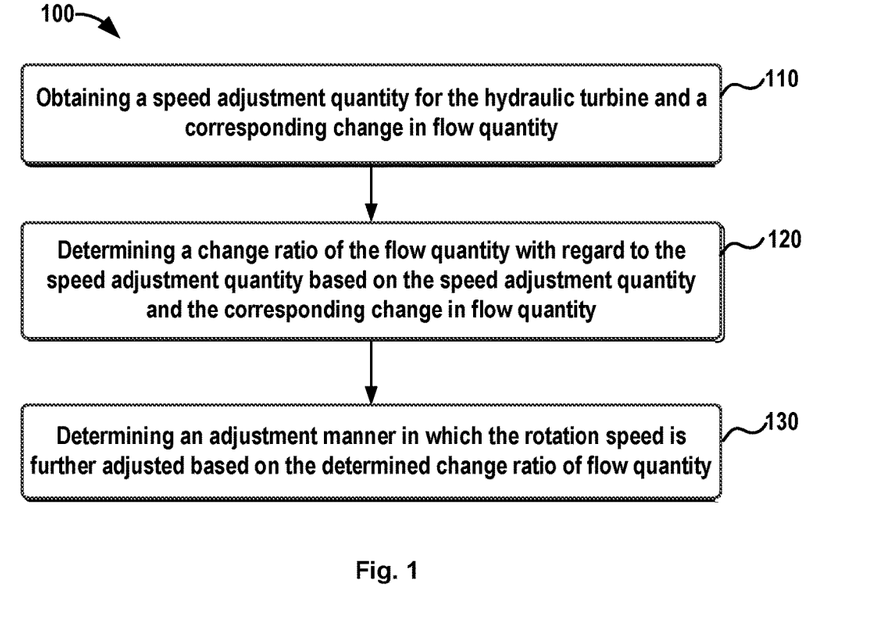
FIG. 1 schematically illustrates a flow chart of a method of operating a hydraulic turbine according to an embodiment of the present disclosure.

Reference is first made to FIG. 1, which illustrates a flow diagram of a method 100 of operating a hydraulic turbine according to an embodiment of the present disclosure. As illustrated in FIG. 1, the method 100 starts from step 110, in which a speed adjustment quantity for the hydraulic turbine and a corresponding change in flow quantity are obtained. The term "speed adjustment quantity" used herein means a speed value by which a rotation speed of the hydraulic turbine is adjusted (increased, or decreased), and it can also be called as a speed adjustment step size.

In the present disclosure, the rotation speed of the hydraulic turbine is not fixed, from beginning to end and it is not set at a speed value which is determined by searching a look-up table; on the contrary, it is adjusted repeatedly based on monitored effect of adjustments to approach the maximum efficiency operation point. Particularly, in embodiments of the present disclosure, the rotation speed of the hydraulic turbine is adjusted based on the speed adjustment quantity. It shall be noticed that a solution for the variable speed operation pf the hydraulic turbine can assume any of the existing variable speed operation solution, for example any of those described in Background.

First, a rotation speed instruction, or alternatively a speed adjustment instruction, can be sent to a hydraulic turbine governor to order the governor to adjust the rotation speed of the hydraulic turbine to a desired speed. The hydraulic turbine governor is a control system for hydraulic turbine which controls the hydraulic turbine to run in a desired power and rotation speed. The rotation speed instruction may indicate a desired rotation speed of the hydraulic turbine. The speed adjustment instruction may indicate a speed adjustment quantity, by which the rotation speed of the hydraulic turbine is changed. Therefore, by means of such a rotation speed instruction or a speed adjustment instruction to the hydraulic turbine governor, it can adjust the rotation speed of the hydraulic turbine to the desired speed. The speed adjustment quantity can be a fixed value and thus it can be obtained directly. The speed adjustment quantity can also a value which can be changed by operations or be changed during the speed adjusting and in such a case, it may obtained from a storing element for the speed adjustment quantity. In addition, it can be obtained from a device sending the rotation speed instruction or the speed adjustment instruction, or from the hydraulic turbine governor receiving the speed adjustment instruction or order. As another option, it is also possible by monitoring the rotation speed change of the hydraulic turbine.

After the rotation speed of the hydraulic turbine is adjusted, it can monitor a corresponding change in flow quantity. In other word, it will obtain an effect of the rotation speed adjustment on the change in flow quantity. For illustration purposes, FIG. 2 schematically illustrates an example of Hill Chart according to an embodiment of the present disclosure.

Figure 2:
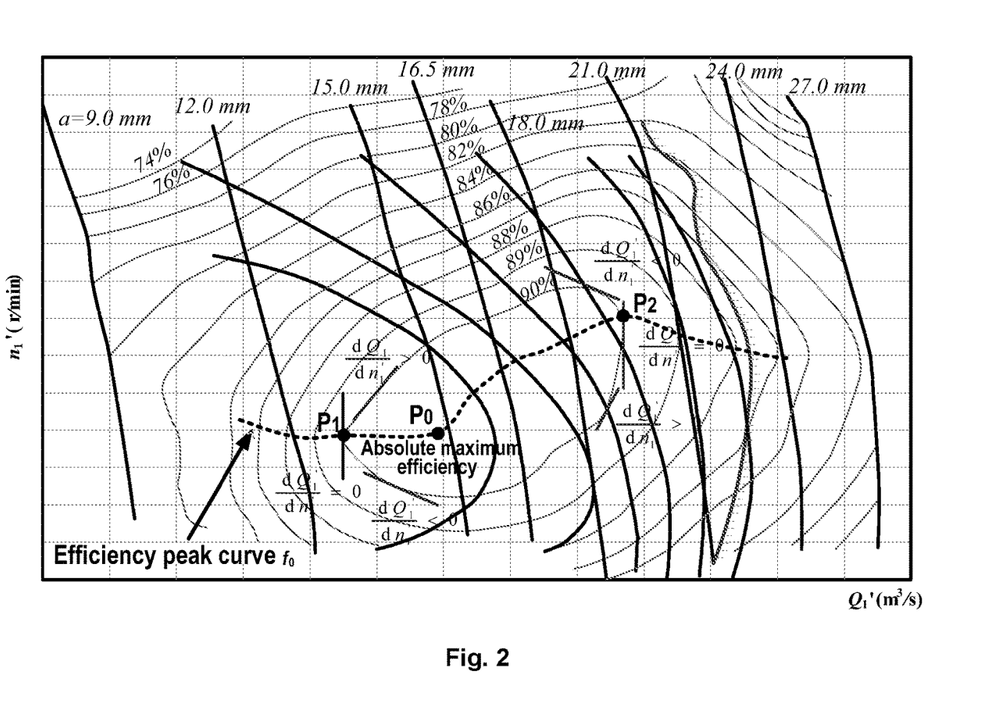
FIG. 2 schematically illustrates an example Hill Chart according to an embodiment of the present disclosure.

The Hill Chart in FIG. 2 illustrates the relationship among the turbine rotation speed, the flow quantity, the water head and the turbine efficiency. In FIG. 2, the lateral axis represents the unit flow quality and the longitudinal axis represents the unit rotation speed. Herein the term "unit flow quantity" means a flow quantity value which is normalized based on theories of hydrologic similarity; similarly, the term "unit rotation speed" means a speed value which is normalized based on the theories of hydrologic similarity as well. Unless specified otherwise, the terms "unit flow quantity" and "unit rotation speed" in FIG. 2 are abbreviated as flow quantity and rotating speed hereinafter.

In FIG. 2, contour lines for a hill represent efficiency curves. Each of contour lines represents a curve with a predetermined efficiency. At each point on a contour line, it can obtain the same efficiency but with different rotation speeds and flow quantities. FIG. 2 illustrates contour lines with efficiency values ranging from 74% to 90%, only for illustrative purposes. In FIG. 2, there are further illustrated dashed lines laterally crossing these contour lines, which indicates the efficiency peak curve $f_0$, and at each point of the curve $f_0$, it can obtain the maximum efficiency for a given operation condition. The slanting lines vertically crossing the contour lines indicate lines for opening angles α of the guide vane (gate) of the hydraulic turbine and in FIG. 2 are illustrated angles ranging from 9.0 mm to 27.0 mm.

From FIG. 2, it is seen that, at intersection points between the efficiency peak curve $f_0$ and the efficiency contour curves, it can achieve maximum efficiencies. At each of these intersection points, the derivative of unit quantity flow Q' with regard to the unit rotation speed n' is zero, i.e., $dQ_1'/dn_1'=0$, as illustrated at point $P_1$ and point $P_2$. This means that the maximum efficiency can be obtained when the change ratio of the quantity flow with regard to the change of the rotation speed is zero. Thus, it will be beneficial to monitor the change ratio of the quantity flow with regard to the change of the rotation speed.

Reference is made back to step 110 in FIG. 1, the low quantity can be monitored for example by many means, for example, a flow meter. Thus, the change in flow quantity can be obtained from the flow meter directly, or a database or repository storing flow quantity measurements from the flow meter. In addition, in a case of the flow meter is used, the hydraulic turbine governor may also have the information about the flow quantity measurements and thus it is also possible to obtain the information from the hydraulic turbine governor.

In addition, the flow quantity can also be reflected by another factor such as an opening angle of a guide vane of the hydraulic turbine since the flow quantity has a predetermined relationship with the opening angle of the guide vane. In FIG. 2, from the Hill Chart curve, it can been seen that the opening angles α of the guide vane has a predetermined relationship with the unit quantity flow, which can be expressed as:

$$a_0 = f_3(Q_1') \quad (1)$$

wherein $Q_1'$ represents the unit flow quantity; $a_0$ is the guide van (gate) opening angle and the function curve or the relationship $f_3()$ can be obtained from the turbine Hill Chart. Thus, it can further obtained the following equation:

$$Q_1' = f_3^{-1}(a_0) \quad (2)$$

wherein $Q_1'$ represents the unit flow quantity; $a_0$ is the guide van (gate) opening angle and the function curve or the relationship $f_3^{-1}()$ is the inverse function of $f_3()$.

Further from FIG. 2, it is clear that that the hydraulic flow increases with an increase in gate opening, and thus, $$\frac{dQ_1'}{da_0} > 0 \quad (3)$$

Thus, it can obtain the following equation:

$$\frac{dQ_1'}{dn_1'} = \frac{dQ_1'}{da_0}\frac{da_0}{dn_1'} = k\frac{da_0}{dn_1'} \quad (4)$$

Wherein the factor k is a positive coefficient. From equation (4), it can be clearly seen that the criteria of maximum efficient $dQ_1'/dn_1'^{40}=0$ is equivalent to $da_0/dn_1'^{40}=0$. This means $da_0/dn_1'$ can be used for the maximum efficiency tracking as an alternative option of the criteria $dQ_1'/dn_1'$.

Thus, it is possible to monitor the change in opening angle of the guide vane to learn the change in flow quantity. The opening angle of the guide vane is determined by the hydraulic turbine governor and thus the opening angle of the guide vane can be obtained from the hydraulic turbine governor.

Therefore, both the speed adjustment quantity for the hydraulic turbine and the corresponding change in flow quantity can be obtained.

Reference is make back to FIG. 1, in step 120, it can determine change ratio of the flow quantity with regard to the speed adjustment quantity based on the speed adjustment quantity and the corresponding change in flow quantity. The change ratio can be determined as, for example, $dQ_1'/dn_1'$, a value obtained by dividing the change in flow quantity by the speed adjustment quantity. In other words, the change in flow quantity with regard to the change of the rotation speed of the hydraulic turbine is determined.

Next in step 130, an adjustment manner in which the rotation speed is further adjusted can be determined based on the change ratio. In embodiments of the present disclosure, the determining of the adjustment manner can comprise determining the adjustment manner as decreasing the rotation speed of the hydraulic turbine in response to the change ratio with a positive value; and determining the adjustment manner as increasing the rotation speed of the hydraulic turbine in response to the change ratio with a negative value. Thus, it may further adjust the rotation speed of the hydraulic turbine in the determined adjustment manner.

Still referring to FIG. 2, it can been seen that, near the maximum efficiency point P1 shown at the left side, the derivative of flow quantity to rotation speed, $dQ_1'/dn_1'$, is larger than zero when it is above the efficiency peak curve $f_0$ and it is smaller than zero when it is below the efficiency peak curve $f_0$. This means that the efficiency curve is ascending near maximum efficiency point P1 when the efficiency curve is above the efficiency peak curve $f_0$. In such a case, the flow quantity of the hydraulic turbine is increased with an increase of the rotation speed of the hydraulic turbine and a larger flow quantity is required to achieve the same efficiency, which means a lower efficiency under certain power order and is undesirable. Thus, the rotation speed of the hydraulic turbine can be decreased.

On the other hand, the efficiency curve is descending when the efficiency curve is below the efficiency peak curve $f_0$. In such a case, the flow quantity of the hydraulic turbine is increased with a decrease of the rotation speed of the hydraulic turbine, and a larger flow quantity is required to achieve the same efficiency, which means a lower efficiency under certain power order and is also undesirable. Thus, the rotation speed of the hydraulic turbine can be increased.

Thus, if the adjustment manner mentioned above is used, the hydraulic turbine will approach the maximum efficiency point P1 shown at the left side. In other words, through repetitive monitoring and adjustments, it will finally operate around at the maximum efficiency point P1 shown at the left side.

Further in FIG. 2, on the efficiency peak curve $f_0$ illustrated by the dashed line, there is an absolute maximum efficiency point, which is indicated by $P_0$ and is a peak point of the hill. If the hydraulic turbine operates at that point $P_0$, it can achieve the absolute maximum efficiency and at that time, the hydraulic turbine will operate with a corresponding power $P_{peak}$, i.e., a power at the absolute maximum efficiency point. For the maximum efficiency point $P_0$ shown at the left side, a corresponding power is smaller than the power $P_{peak}$, while for the maximum efficiency point $P_1$ shown at the right side, a corresponding power is larger than the power $P_{peak}$. Generally, the hydraulic turbine will operate with a power lower than or equal to the power $P_{peak}$. Thus, if the adjustment manner mentioned above is used and it finally causes the hydraulic turbine to operate around at the maximum efficiency point P1, it can work since it usually does not require the hydraulic turbine to working with a power higher than the $P_{peak}$.

However, in some certain situations, it may allow the hydraulic turbine to work with a power higher than the $P_{peak}$. In such a case, it may further consider the power ordered by for example an operator. If the ordered power $P_{ord}$ is lower than or equal to the power $P_{peak}$, it can perform the determining of the adjustment manner as described above. That is to say, if the hydraulic turbine is expected to operate below the power $P_{peak}$, the adjustment manner can be determined as decreasing the rotation speed of the hydraulic turbine if the change ratio has a positive value, i.e. $dQ_1'/dn_1'>0$; and it can be determined as increasing the rotation speed of the hydraulic turbine if the change ratio has a negative value $dQ_1'/dn_1'<0$.

On the contrary, if the ordered power $P_{ord}$ is higher than the power $P_{peak}$, it can perform the determining of the adjustment manner in a different way. That is to say, if the hydraulic turbine is expected to operate above the power $P_{peak}$, the adjustment manner can be determined as increasing the rotation speed of the hydraulic turbine if the change ratio has a positive value, $dQ_1'/dn_1'>0$; and it can be determined as decreasing the rotation speed of the hydraulic turbine if the change ratio has a negative value $dQ_1'/dn_1'<0$.

As is clear From FIG. 2, near the maximum efficiency point $P_2$ shown at the right side, the derivative of flow quantity to rotation speed, $dQ_1'/dn_1'$ is lower than zero when it is above the efficiency peak curve $f_0$ and it is larger than zero when it is below the efficiency peak curve $f_0$, which is totally different from the maximum efficiency point $P_1$. This means that the efficiency curve is descending near the maximum efficiency point P2 when the efficiency curve is above the efficiency peak curve $f_0$. In such a case, the flow quantity of the hydraulic turbine is increased with a decrease of the rotation speed of the hydraulic turbine. Thus, if the hydraulic turbine is expected to operate at a power higher than the $P_{peak}$, the rotation speed of the hydraulic turbine can be decreased so that it can approach the maximum efficiency point P2.

On the other hand, the efficiency curve is ascending when the efficiency curve is below the efficiency peak curve $f_0$. In such a case, the flow quantity of the hydraulic turbine is increased with an increase of the rotation speed of the hydraulic turbine. Thus, if the hydraulic turbine is expected to operate at a power higher than the $P_{peak}$, the rotation speed of the hydraulic turbine can be increased. In such a case, the hydraulic turbine will approach the maximum efficiency point P2 shown at the right side. In other words, through multiple adjustments, it will finally operate around at the maximum efficiency point P2 shown at the right side.

Thus, by means of repetitive monitoring and adjustments, the hydraulic turbine will track the maximum efficiency operation point under given power order and water head in real time at a low cost.

Figure 3:
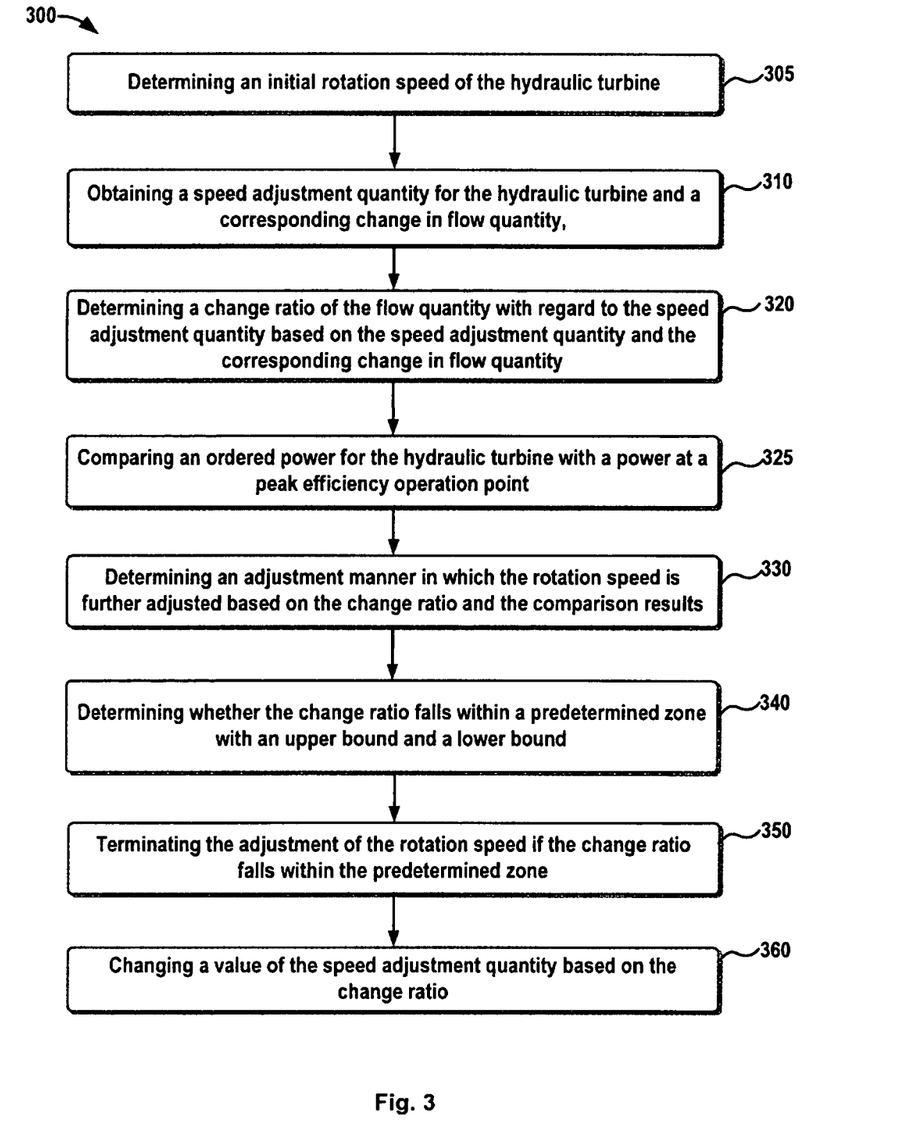
FIG. 3 schematically illustrates a flow chart of a method of operating a hydraulic turbine according to another embodiment of the present disclosure.

In addition, FIG. 3 schematically illustrates a flow diagram of a method 300 of operating a hydraulic turbine according to another embodiment of the present disclosure. As illustrated in FIG. 3, in step 305, an initial rotation speed of the hydraulic turbine can be first determined. It can be understood that the adjustment will always start from a certain rotation speed, and preferably, it may start from a predetermined speed although it is possible to start from a zero speed.

The predetermined speed can be a default speed for any operation conditions, or it can be different for different operations conditions and determined based on experiences. In addition, it can also be obtained based on a look-up table (describing the Hill Chart) characterizing the relationship among a turbine rotation speed, the flow quantity, the water head and the turbine efficiency. That is to say, before performing the rotation speed adjustment, it is possible to find a coarse operation point by searching for a rotation speed corresponding to the ordered power $P_{ord}$ for the hydraulic turbine and a water head Hy. Then, the adjusting of the rotation speed of the hydraulic turbine can be performed initially from the found coarse rotation speed. Since the coarse rotation speed is a rotation speed which is around the maximum efficiency operation point and thus, the adjustment process might be shorted greatly if the coarse rotation speed is used as the start point of the adjustment.

Then in steps 310 and 320, like steps 110 and 120, the speed adjustment quantity for the hydraulic turbine and a corresponding change in flow quantity can be obtained and the change ratio of the flow quantity with regard to the speed adjustment quantity can be determined based on the obtained speed adjustment quantity and the corresponding change in flow quantity. For detailed operations of steps 310 and 320, reference can be made to related description with reference to FIG. 1.

In addition, in step 325, it may further compare an ordered power for the hydraulic turbine with a power at an absolute maximum efficiency point. As mentioned hereinabove, in a case it is allowable for the hydraulic turbine to operate with a power higher than the $P_{peak}$, it may further consider the ordered power for the hydraulic turbine. However, it could be understood, this step is optional, which is dependent on the application requirements.

In step 330, in a case the ordered power is considered, an adjustment manner for the following rotation speed adjustment can be determined based on the determined change ratio of flow quantity and the comparison results. In an embodiment of the present disclosure, it can determine the adjustment manner as decreasing the rotation speed of the hydraulic turbine, in response to the change ratio with a positive value and the result showing the ordered power being lower than or equal to the power at the absolute maximum efficiency point. In another embodiment of the present disclosure, it can determine the adjustment manner as increasing the rotation speed of the hydraulic turbine in response to the change ratio with a negative value and the result showing the ordered power being lower than or equal to the power at the absolute maximum efficiency point. In a further embodiment of the present disclosure, it can determine the adjustment manner as increasing the rotation speed of the hydraulic turbine, in response to the change ratio with a positive value and the result showing the ordered power being higher than the power at the absolute maximum efficiency point. In a still further embodiment of the present disclosure, it can determine the adjustment manner as decreasing the rotation speed of the hydraulic turbine, in response to the change ratio with a negative value and the result showing the ordered power being higher than the power at the absolute maximum efficiency point. The reasons why the determining of the speed adjustment manner is performed in this way are already described in details with reference to FIG. 2 and thus will not be elaborated herein.

Further, in step 340, it may further determine whether the change ratio of the flow quantity falls within a predetermined zone with an upper bound and a lower bound, and terminating the adjustment of the rotation speed if the change ratio does fall within the predetermine zone in step 350. The term "predetermined zone" herein may be called as a dead zone, which includes the upper bound and lower bound for the change ratio. Once the operation enters this dead zone, it means further adjustment operation could not improve the operation efficiency of the hydraulic turbine substantially and thus the adjustment can be terminated. However, it can be understood thin steps 340 and 350 are optional operations and in real applications, it is also possible to keep the method running and in such a case, if the operation condition changes, it may still track the maximum efficiency operation point.

Moreover, it is also possible to change or adjust the speed adjustment quantity based on the change ratio in step 360. For example, if it is monitored that the change ratio is vibrated around zero, it may decrease the speed adjustment quantity. On the other hand, if the same adjustment manner is determined for a predetermined number of times, it may increase the speed adjustment quantity. Or alternatively, it is also possible to monitor the change of the change ratio, if the change is lower than a predetermined value, then it may increase the speed adjustment quantity. Thus, the adjustment process might be facilitated greatly and the adjustment efficiencies can be improved substantially.

It can be understood that although FIG. 3 describes an embodiment in which all of steps 305, 325, steps 340 and 350, and step 360 are combined with the solution of FIG. 1, the present disclosure is not limited to the described embodiments. In fact, any of steps 305, 325, steps 340 and 350, and step 360 can be combined with the solution of FIG. 1 separately or in any combination.

It can also be understood that in FIG. 3, the steps are illustrated as being performed in a certain order, but the present disclosure is not limited the certain order. In fact, some of steps can be performed in a reverse order or be performed simultaneously. For example, step 325 can be performed at any step before step 330; step 330, steps 340 and 350 and step S360 can be performed in any different order.

Hereinafter, reference will be made to FIGS. 4 and 5 to describe two possible specific examples of determining the adjustment manner for a hydraulic turbine in the present disclosure.

Figure 4:
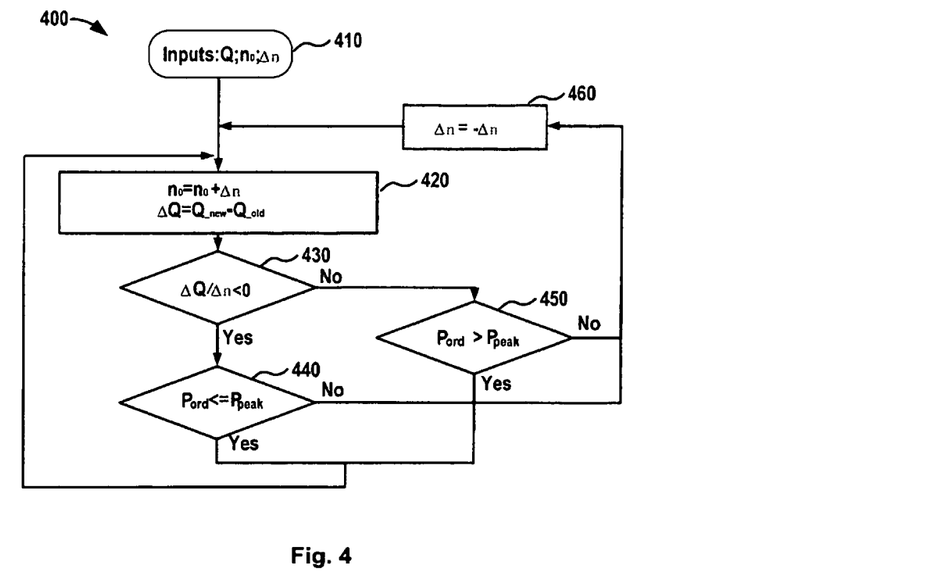
FIG. 4 schematically illustrates a flow chart of determining an adjustment manner for a hydraulic turbine according to an embodiment of the present disclosure.

FIG. 4 schematically illustrates a flow chart of determining the adjustment manner for a hydraulic turbine according to an embodiment of the present disclosure. As illustrated in FIG. 4, the method 400 starts from step 410, an initial rotation speed $n_0$, the speed adjustment amount $\Delta n$, flow quantity Q are obtained. In step 420, the new rotation speed no can be determined as $n_0 + \Delta n$ and send a rotation speed order to for example, the hydraulic turbine governor. It can be understood, that it is also possible to send a speed adjustment order or instruction containing the speed adjustment quantity, to the hydraulic turbine governor.

Then, the new flow quantity is monitored and the change between the new flow quantity Q_new and the old flow quantity Q_old is determined. In step 430, it may determine a change ratio of the flow quantity with regard to the speed adjustment quantity, for example a ratio of the change of flow quantity to the speed adjustment quantity, i.e., $\Delta Q/\Delta n$. In step 430, it may further determine whether the change ratio $\Delta Q/\Delta n$ is lower than zero.

If the change ratio $\Delta Q/\Delta n$ has a negative value in step 430, it may further determine whether a power $P_{ord}$ as indicated in a power order is lower than or equal to power $P_{peak}$ or not in step 440. As described above, the power $P_{peak}$ indicates the power at an absolute maximum efficiency point. If the power $P_{ord}\leq$ the power $P_{peak}$ in step 440, the method goes back to step 420 and continues increasing of the rotation speed. If in step 440, the power $P_{ord}>$ the power $P_{peak}$, the adjustment manner may be determined as decreasing the rotation speed by changing the sign of the speed adjustment quantity in step 460 and the method goes to step 420 to decrease the rotation speed.

If the change ratio $\Delta Q/\Delta n$ has a zero value or a positive value in step 430, it may also determine whether the power $P_{ord}$ as indicated in a power order is larger than the power $P_{peak}$ or not in step 450. If the power $P_{ord}>$ the power $P_{peak}$ in step 450, the method goes back to step 420 directly and continues increasing of the rotation speed. If in step 450, the power $P_{ord}\leq$ the power $P_{peak}$, the adjustment manner may be determined as decreasing the rotation speed by changing the sign of the speed adjustment quantity in step 460 and the method goes to step 420 to decrease the rotation speed.

Figure 5:
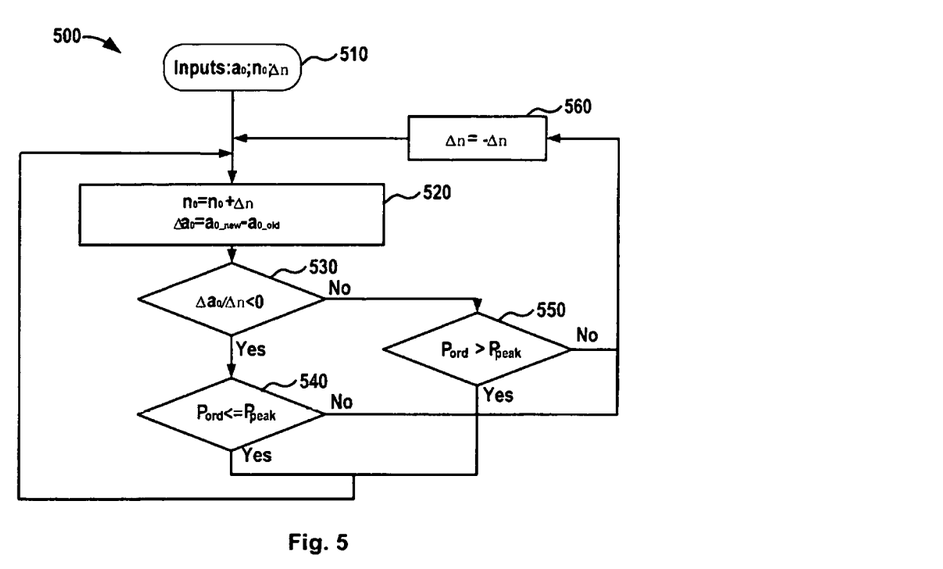
FIG. 5 schematically illustrates a flow chart of determining an adjustment manner for a hydraulic turbine according to another embodiment of the present disclosure.

FIG. 5 schematically illustrates a flow chart of determining the adjustment manner for a hydraulic turbine according to another embodiment of the present disclosure. Different from FIG. 4, in FIG. 5, the opening angles $a_0$ of the guide vane of the hydraulic turbine is used instead of the flow quantity Q. Thus, in step 510, the opening angle $a_0$ of the guide vane, an initial rotation speed $n_0$, and a speed adjustment quantity $\Delta n$ are obtained. In step 520, the change $\Delta a_0$ in the opening angle of the guide vane is determined as $a_{0\_new} - a_{0\_old}$. In step 530, the change ratio of the opening angle of the guide vane with regard to the speed adjustment quantity Dao/On is determined and compared with zero. The following steps 540, 550 and 560 are similar to steps 440, 450 and 460, and thus will not be detailed herein for a purpose of simplification.

It shall be noticed that whether the operation in step 420 or 520 means a decreasing or an increasing of the rotation speed is dependent on the sign of the speed adjustment quantity $\Delta n$. It can also be understood that in FIGS. 4 and 5, the initial or default adjustment manner as indicated step 420 indicate increasing the rotation speed of the hydraulic turbine and in fact, it may also initially indicate decreasing the rotation speed of the hydraulic turbine. That is to say, the initial value of the speed adjustment quantity can also be a negative value, and in such a case, the changing of the adjustment manner as illustrated in step 460 or 560 can be performed after the "Yes" answer in step 440 or 540 and step 450 or 550 instead of after the "No" answer in them. In addition, it can be understood that it can also determine $n_0 - \Delta n$ and the $\Delta n$ can also has a positive initial value or a negative initial value. However, in these cases, the skilled in the art can make modifications to the flow charts as illustrated in FIGS. 4 and 5 from the teaching provided herein to achieve similar effects.

Figure 6:
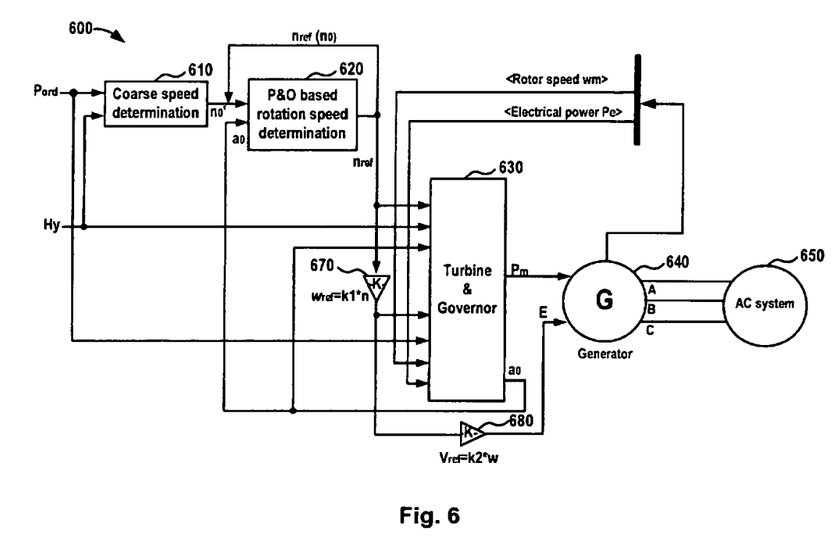
FIG. 6 schematically illustrates a block diagram of a hydraulic electric-generation system with the operation solution according to an embodiment of the present disclosure.

FIG. 6 schematically illustrates a block diagram of a hydraulic electric-generation system with the solution according to an embodiment of the present disclosure. As illustrated in FIG. 6, the initial inputs include the ordered power as indicated by a power order $P_{ord}$ and the water head Hy. Based on the two inputs, a coarse (or initial) speed determination module 610 can determine the initial rotation speed $n_0'$ of the hydraulic turbine based on a power order $P_{ord}$ and the water head Hy by searching for a corresponding rotation speed in a look-up table characterizing the relationship among a turbine rotation speed, the flow quantity, the water head and the turbine efficiency. Thus the initial rotation speed $n_0'$ can be provided to the rotation speed determination module 620 which will perform the rotation speed determination for the speed adjustments based on the solution of operating the hydraulic turbine as described herein. An example of the rotation speed determination module 620 will described with reference to FIG. 7 and thus will be simplified herein. The determined rotation speed can be provided to the turbine & governor 630, the governor will control the hydraulic turbine to operate with an angular velocity $w_{ref}$ (determined by a multiplier 670 from nrof and a factor k1 representing the proportional relationship between the angular velocity reference $w_{ref}$ and the rotation speed of the hydraulic turbine), the ordered power $P_{ord}$ (as the reference power) based on the rotor angular velocity wm and the electrical power value Pe fed from the synchronous machine 640. The turbine further drives the synchronous machine to operate at the power Pm and voltage $V_{ref}$. The voltage reference $V_{ref}$ is obtained from the angular velocity $w_{ref}$ and another factor k2 of another multiplier 680 representing the proportional relationship between the voltage and the angel velocity reference $w_{ref}$. The synchronous machine further generates power to an AC grid system 650 and feeds the rotor angular velocity wm and the electrical power value Pe back to the turbine & governor 630. It shall be noticed that the solution for the variable speed operation pf the hydraulic turbine can assume any of the existing variable speed operation solution, for example any of those described in Background.

Figure 7:
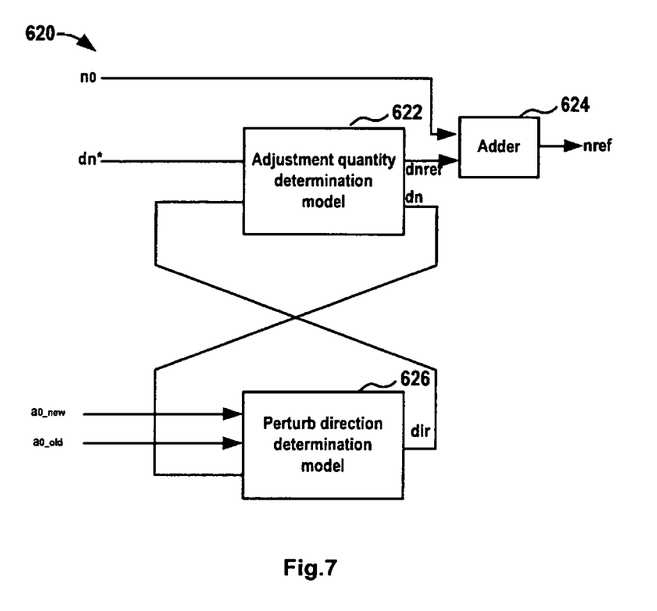
FIG. 7 schematically illustrates a diagram block of Perturb and Observer (P&O) based rotation speed determination module according to an embodiment of the present disclosure.

Hereinafter, for illustration purposes, reference will be made to FIG. 7, which schematically illustrates a diagram block of the rotation speed determination module 620 according to an embodiment of the present disclosure. As illustrated in FIG. 7, the rotation speed determination module 620 mainly includes an adjustment quantity determination module 622, an adder 624, a perturb direction determination module 626. The adjustment quantity determination module 622 is configured to output the speed adjustment quantity $d_{nref}$ to the adder 624 based on the input dn* and the input dir from the perturb direction determination module 626. The adjustment quantity determination module 622 is also configured to feed back the change quantity in rotation speed dn to the perturb direction determination module 626. The adder 624 is configured to add the rotation speed $n_0$ with the speed adjustment quantity dnref to obtain the rotation reference nref to the turbine governor. The perturb direction determination module 626 is configured to determine the change $\Delta a_0$ of the opening angle based on the $a_{0\_new}$ and $a_{0\_old}$, and further determine the change ratio of the opening angle of the guide vane with regard to the speed adjustment quantity dn. The perturb direction determination module 626 is also configured to determine the perturb direction or the speed adjustment direction based on the change ratio, as already described with reference to any of FIGS. 1 to 6.

Figure 8A:
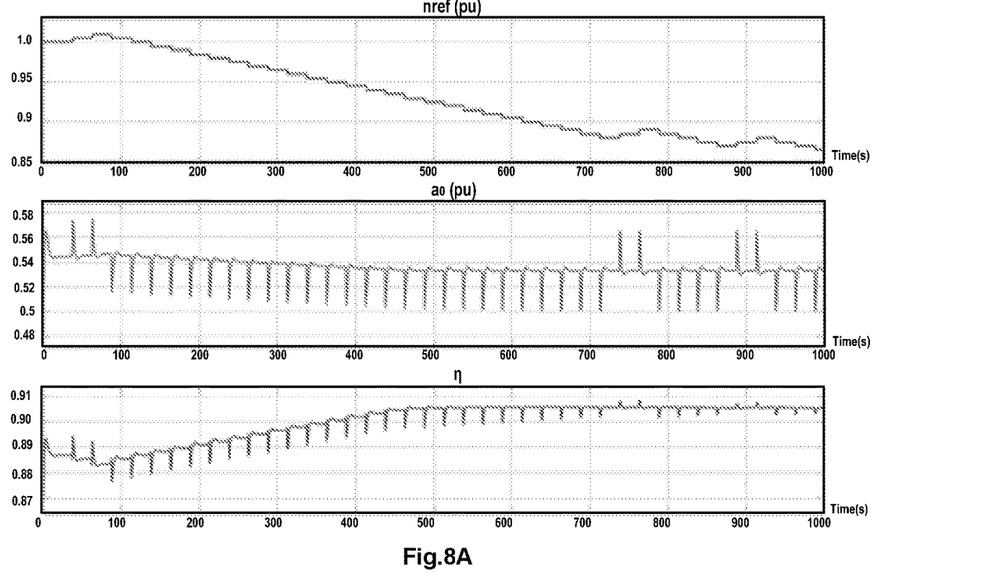
FIGS. 8A and 8B schematically illustrates charts for results of simulation which are performed on a hydraulic electric-generation system according to an embodiment of the present disclosure.
Figure 8B:
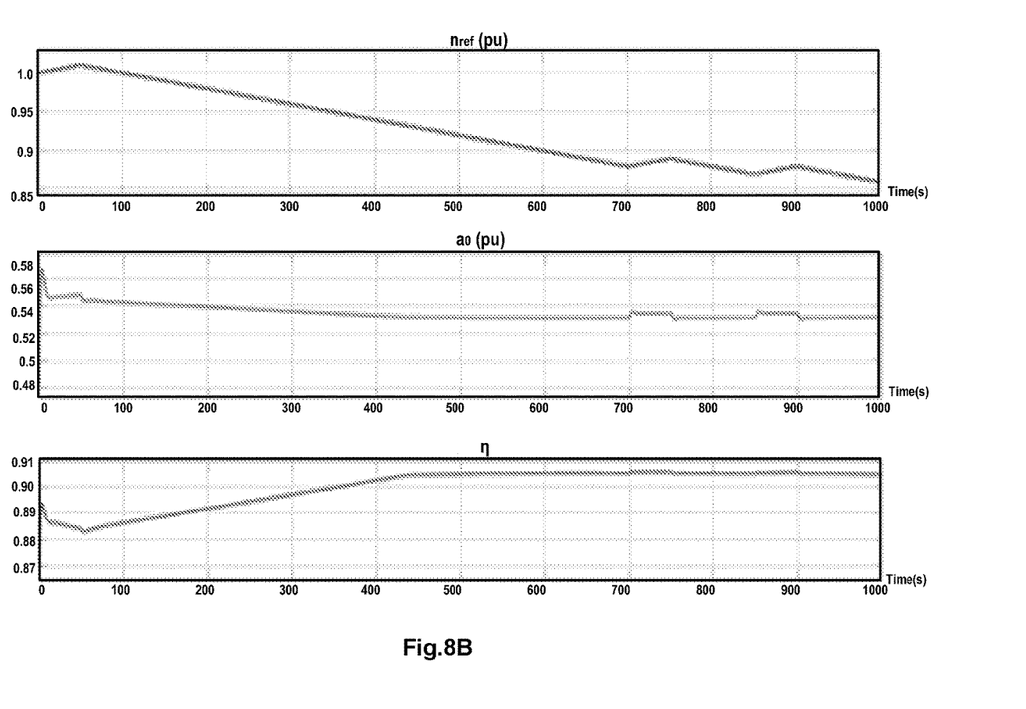

For a system as illustrated in FIG. 6, a simulation model is established and simulation results for case 1 and case 2 with different settings are respectively shown in FIGS. 8A and 8B, in which η represents the turbine efficiency. For case both 1 and case 2, the actual power of VSC is set to 0.5 per unit (pu) as a constant (emulated by a dynamic load block with constant P and Q). The turbine rotation speed is set to 1 pu initially. The initial perturb direction is set to increase the rotation speed. Ramping rate of nref is set to 0.02% pu/second. To avoid the water hammer effort during the perturbing, the step size Tn for perturb is set to be smaller than observation ramping time Ta. For case 1 as illustrated in FIG. 8A, Tn=25 s, Ta=50 s and a perturb step size is Δn=0.005; for case 2, Tn=0.05 s, Ta=50 s and a perturb step size Δn=1e-5.

It can be observed from FIG. 8A and FIG. 8B that a smaller Δn realizes smoothing approximation of the maximum efficiency; however, the determination of Tn, Ta and Δn is a case-by-case issue, which is highly related with the turbine, penstock as well as generator parameters. It can also be observed that, at the beginning of operations, the speed reference $n_{ref}$ is increasing. Due to the wrong perturb direction, the gate opening $a_0$ increases, which means more water quantity is required for the same electrical load, i.e. lower efficiency. After one observation sample time, this wrong perturb direction is corrected. At about t=700 s, the maximum efficiency point is reached and the turbine rotating speed n is hovered around the maximum efficiency point.

Thus, it can be seen that the solution as described herein can track the maximum efficiency operation point under given power order and water head in real time and thus the efficiency of the turbine during operation is increased and it is possible to obtain additional benefit with a low cost.

Figure 9:
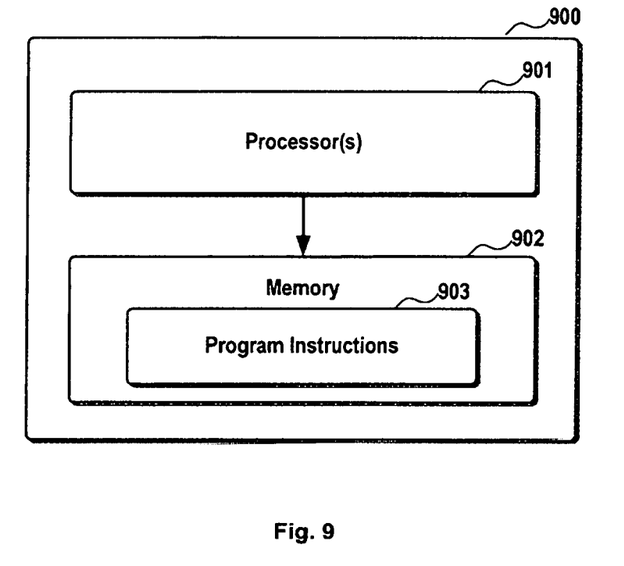
FIG. 9 schematically illustrates a block diagram of a system for operating a hydraulic turbine according to an embodiment of the present disclosure.

FIG. 9 further schematically illustrates a system 900 for operating a hydraulic turbine according to an embodiment of the present disclosure. As illustrated in FIG. 9, the system 900 may comprise one or more processors 901, a memory 902 coupled to at least one of the processors 901, and a set of program instructions 903 stored in the memory 902. The program instructions 903 can be executable by at least one of the processors to cause the system to: obtain a speed adjustment quantity for the hydraulic turbine and a corresponding change in flow quantity, wherein a rotation speed of the hydraulic turbine is adjusted based on the speed adjustment quantity; determine a change ratio of flow quantity with regard to the speed adjustment quantity based on the speed adjustment quantity and the corresponding change in flow quantity; and determine an adjustment manner in which the rotation speed is further adjusted based on the change ratio.

In an embodiment of the present disclosure, the obtaining a corresponding change in flow quantity can include obtaining a change of opening angle of a guide vane of the hydraulic turbine, and wherein the determining a change ratio of flow quantity with regard to the speed adjustment quantity comprises: determining a change ratio of the opening angle of the guide vane with regard to the speed adjustment quantity.

In another embodiment of the present disclosure, the determining an adjustment manner may further comprise any one or more of: determining the adjustment manner as decreasing the rotation speed of the hydraulic turbine in response to the change ratio with a positive value; and determining the adjustment manner as increasing the rotation speed of the hydraulic turbine in response to the change ratio with a negative value.

In a further embodiment of the present disclosure, the system 1000 may be further cased to compare an ordered power for the hydraulic turbine with a power at an absolute maximum efficiency point. In such a case, the determining an adjustment manner may be further based on a result of the comparing.

In embodiments of the present disclosure, the determining an adjustment manner may include any one or more of: determining the adjustment manner as decreasing the rotation speed of the hydraulic turbine in response to the change ratio with a positive value and the result showing the ordered power being lower than or equal to the power at the absolute maximum efficiency point; and determining the adjustment manner as increasing the rotation speed of the hydraulic turbine in response to the change ratio with a negative value and the result showing the ordered power being lower than or equal to the power at the absolute maximum efficiency point; determining the adjustment manner as increasing the rotation speed of the hydraulic turbine in response to the change ratio with a positive value and the result showing the ordered power being higher than the power at the absolute maximum efficiency point; and determining the adjustment manner as decreasing the rotation speed of the hydraulic turbine in response to the change ratio with a negative value and the result showing the ordered power being higher than the power at the absolute maximum efficiency point.

In another embodiment of the present disclosure, the system 900 can be further caused to: determine whether the change ratio falls within a predetermined zone with an upper bound and a lower bound; and terminate the adjustment of the rotation speed if the change ratio falls within the predetermined zone.

In a further embodiment of the present disclosure, the system 900 can be further caused to: change a value of the speed adjustment quantity based on the change ratio.

In another embodiment of the present disclosure, the system 900 may be further caused to: determine an initial rotation speed of the hydraulic turbine based on an ordered power for the hydraulic turbine, a water head, and a look-up table characterizing the relationship among a turbine rotation speed, the flow quantity, the water head and the turbine efficiency; wherein the adjusting a rotation speed of the hydraulic turbine is performed initially from the initial rotation speed.

Figure 10:
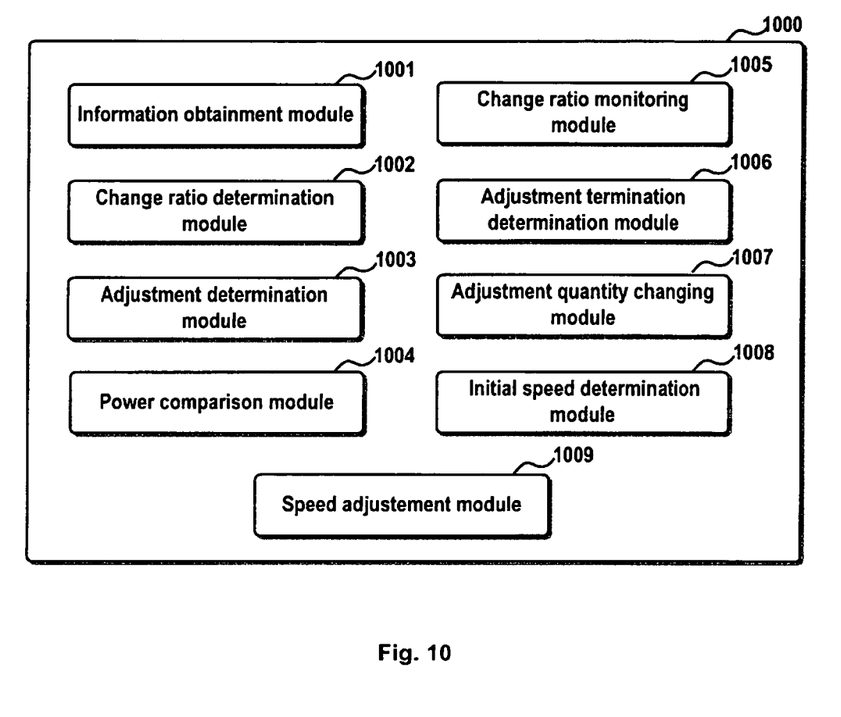
FIG. 10 schematically illustrates a block diagram of an apparatus for operating a hydraulic turbine according to an embodiment of the present disclosure.

FIG. 10 schematically illustrates a block diagram of an apparatus 1000 for operating a hydraulic turbine according to an embodiment of the present disclosure. As illustrated in FIG. 10, the apparatus 1000 may include an information obtainment module 1001, a change ratio determination module 1002 and an adjustment determination module 1003. The information obtainment module 1001 may be configured to obtain a speed adjustment quantity for the hydraulic turbine and a corresponding change in flow quantity, wherein a rotation speed of the hydraulic turbine is adjusted based on the speed adjustment quantity. The change ratio determination module 1002 may be configured to determine a change ratio of flow quantity with regard to the speed adjustment quantity based on the speed adjustment quantity and the corresponding change in flow quantity. The adjustment determination module 1003 may be configured to determine an adjustment manner in which the rotation speed is further adjusted based on the change ratio.

In an embodiment of the present disclosure, the information obtainment module 1001 can be further configured to obtain a change of opening angle of a guide vane of the hydraulic turbine, and the change ratio determination module is further configured to: determine a change ratio of the opening angle of the guide vane with regard to the speed adjustment quantity.

In another embodiment of the present disclosure, the adjustment determination module 1003 can be further configured to: determine the adjustment manner as decreasing the rotation speed of the hydraulic turbine in response to the change ratio with a positive value; and determine the adjustment manner as increasing the rotation speed of the hydraulic turbine in response to the change ratio with a negative value.

In a further embodiment of the present disclosure, the apparatus 1000 may further include a power comparison module 1004, which can be configured to compare an ordered power for the hydraulic turbine and a power at an absolute maximum efficiency point. The adjustment determination module 1003 is further configured to determine the adjustment manner based on a result of the comparing.

In a still further embodiment of the present disclosure, the adjustment determination module 1003 is further configured to determine the adjustment manner by any one or more of: determining the adjustment manner as decreasing the rotation speed of the hydraulic turbine in response to the change ratio with a positive value and the result showing the ordered power being lower than or equal to the power at the absolute maximum efficiency point; and determining the adjustment manner as increasing the rotation speed of the hydraulic turbine in response to the change ratio with a negative value and the result showing the ordered power being lower than or equal to the power at the absolute maximum efficiency point; determining the adjustment manner as increasing the rotation speed of the hydraulic turbine in response to the change ratio with a positive value and the result showing the ordered power being higher than the power at the absolute maximum efficiency point; and determining the adjustment manner as decreasing the rotation speed of the hydraulic turbine in response to the change ratio with a negative value and the result showing the ordered power being higher than the power at the absolute maximum efficiency point.

In another embodiment of the present disclosure, the system 1000 can further comprise a change ratio monitoring module 1005 configured to determine whether the change ratio falls within a predetermined zone with an upper bound and a lower bound and an adjustment termination determination module 1006 configured to terminate the adjustment of the rotation speed if the change ratio falls within the predetermined zone.

In a still further embodiment of the present disclosure, the apparatus 1000 may further comprise a speed adjustment quantity changing module 1007 configured to change a value of the speed adjustment quantity based on the change ratio.

In a yet further embodiment of the present disclosure, the apparatus 1000 may further comprise an initial speed determination module 1008. The initial speed determination module 1008 can be configured to determine an initial rotation speed of the hydraulic turbine based on an ordered power for the hydraulic turbine, a water head, and a look-up table characterizing the relationship among a turbine rotation speed, the flow quantity, the water head and the turbine efficiency. In such a case, the adjusting a rotation speed of the hydraulic turbine can be performed initially from the initial rotation speed.

In a still further embodiment of the present disclosure, the apparatus may further comprise a speed adjustment module 1009, configured to adjust the rotation speed of the hydraulic turbine in the determined adjustment manner.

It is to be understood that specific embodiments of the present disclosure are described with reference to the accompanying drawings; however, they are presented only for illustration purposes and the present disclosure is not limited thereto. For example, although the solution can be performed by a separate processor which is different from the turbine governor, it is also possible to combine the functionalities of the separate processor within the turbine governor to control the operation of the hydraulic turbine.

The skilled in the art can also appreciate that the solution as provided herein may take the form of a hardware embodiment, a software embodiment (including firmware, resident software, micro-code, etc.) or an embodiment combining software and hardware aspects. That is to say, the reference face determination, start & search point determination, via points determination and instruction generations can be implemented by electronic elements or devices, software stored in storage device, or the combination of electronic devices and the software, for example by micro-processors, digital signal processor, simple chip machine, and suitable programs etc.

Hereinabove, embodiments of the present disclosure have been described in details through embodiments with reference to the accompanying drawings. It should be appreciated that, while this specification contains many specific implementation details, these details should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method of tracking a maximum efficiency operation point of a hydraulic turbine, comprising:
   obtaining a speed adjustment quantity for the hydraulic turbine and a corresponding change in flow quantity, wherein a rotation speed of the hydraulic turbine is adjusted based on the speed adjustment quantity;
   determining a turbine efficiency defined as a change ratio of the flow quantity with regard to the speed adjustment quantity based on the speed adjustment quantity and the corresponding change in flow quantity; and
   determining an adjustment manner in which the rotation speed is further adjusted to increase the turbine efficiency.

2. The method of claim 1, wherein the obtaining a corresponding change in flow quantity comprises obtaining a change of opening angle of a guide vane of the hydraulic turbine, and
   wherein the determining a change ratio of flow quantity with regard to the speed adjustment quantity comprises: determining a change ratio of the opening angle of the guide vane with regard to the speed adjustment quantity.

3. The method of claim 1, wherein the determining an adjustment manner further comprises any one or more of:
   determining the adjustment manner as decreasing the rotation speed of the hydraulic turbine in response to the change ration with a positive value; and
   determining the adjustment manner as increasing the rotation speed of the hydraulic turbine in response to the change ratio with a negative value.

4. The method of claim 1, further comprising:
   comparing an ordered power for the hydraulic turbine with a power at an absolute maximum efficiency point;
   wherein the determining an adjustment manner is further based on a result of the comparing.

5. The method of claim 4, wherein the determining an adjustment manner comprises any one or more of:
   determining the adjustment manner as decreasing the rotation speed of the hydraulic turbine in response to the change ratio with a positive value and the result showing the ordered power being lower than or equal to the power at the absolute maximum efficiency point; and
   determining the adjustment manner as increasing the rotation speed of the hydraulic turbine in response to the change ratio with a negative value and the result showing the ordered power being lower than or equal to the power at the absolute maximum efficiency point;
   determining the adjustment manner as increasing the rotation speed of the hydraulic turbine in response to the change ratio with a positive value and the result showing the ordered power being higher than the power at the absolute maximum efficiency point; and
   determining the adjustment manner as decreasing the rotation speed of the hydraulic turbine in response to the change ratio with a negative value and the result showing the ordered power being higher than the power at the absolute maximum efficiency point.

6. The method of claim 1, further comprising:
   determining whether the change ration falls within a predetermined zone with an upper bound and a lower bound; and
   terminating the adjustment of the rotation speed if the change ratio falls within the predetermined zone.

7. The method of claim 1, further comprising:
   changing a value of the speed adjustment quantity based on the change ratio.

8. The method of claim 1, further comprising:
   determining an initial rotation speed of the hydraulic turbine based on an ordered power for the hydraulic turbine, a water head, and a look-up table characterizing the relationship among a turbine rotation speed, the flow quantity, the water head and the turbine efficiency;
   wherein the adjusting a rotation speed of the hydraulic turbine is performed initially from the initial rotation speed.

9. The method of claim 1, further comprising:
   adjusting the rotation speed of the hydraulic turbine in the determined adjustment manner.

10. A system for tracking a maximum efficiency operation point of a hydraulic turbine, comprising:
    one or more processors;
    a memory coupled to at least one of the processors; and
    a set of program instructions stored in the memory and executable by at least one of the processors to cause the system to:
    obtain a speed adjustment quantity for the hydraulic turbine and a corresponding change in flow quantity, wherein a rotation speed of the hydraulic turbine is adjusted based on the speed adjustment quantity;
    determine a turbine efficiency defined as a change ratio of flow quantity with regard to the speed adjustment quantity based on the speed adjustment quantity and the corresponding change in flow quantity; and
    determine an adjustment manner in which the rotation speed is further adjusted to increase the turbine efficiency.

11. The system of claim 10, wherein the obtainment of a corresponding change in flow quantity comprises obtaining a change of opening angle of a guide vane of the hydraulic turbine, and
    wherein the determination of a change ratio of flow quantity with regard to the speed adjustment quantity comprises: determine a change ratio of the opening angle of the guide vane with regard to the speed adjustment quantity.

12. The system of claim 10, wherein the determination of an adjustment manner further comprises any one or more of:
    determine the adjustment manner as decreasing the rotation speed of the hydraulic turbine in response to the change ratio with a positive value; and determine the adjustment manner as increasing the rotation speed of the hydraulic turbine in response to the change ration with a negative value.

13. The system of claim 10, wherein the system is further caused to:
compare an ordered power for the hydraulic turbine with a power at an absolute maximum efficiency point;
wherein the determine an adjustment manner is further based on a result of the comparing.

14. The system of claim 13, wherein the determination of an adjustment manner comprises any one or more of:
determine the adjustment manner as decreasing the rotation speed of the hydraulic turbine in response to the change ratio with a positive value and the result showing the ordered power being lower than or equal to the power at the absolute maximum efficiency point; and
determine the adjustment manner as increasing the rotation speed of the hydraulic turbine in response to the change ratio with a negative value and the result showing the ordered power being lower than or equal to the power at the absolute maximum efficiency point;
determine the adjustment manner as increasing the rotation speed of the hydraulic turbine in response to the change ratio with a positive value and the result showing the ordered power being higher than the power at the absolute maximum efficiency point; and
determine the adjustment manner as decreasing the rotation speed of the hydraulic turbine in response to the change ratio with a negative value and the result showing the ordered power being higher than the power at the absolute maximum efficiency point.

15. The system of claim 10, wherein the system is further caused to:
determine whether the change ratio falls within a predetermined zone with an upper bound and a lower bound; and
terminate the adjustment of the rotation speed if the change ratio falls within the predetermined zone.

16. The system of claim 10, wherein the system is further caused to:
change a value of the speed adjustment quantity based on the change ratio.

17. The system of claim 10, wherein the system is further caused to:
determine an initial rotation speed of the hydraulic turbine based on an ordered power for the hydraulic turbine, a water head, and a look-up table characterizing the relationship among a turbine rotation speed, the flow quantity, the water head and the turbine efficiency;
wherein the adjustment of a rotation speed of the hydraulic turbine is performed initially from the initial rotation speed.

18. The system of claim 10, wherein the system is further configured to adjust the rotation speed of the hydraulic turbine in the determined adjustment manner.

19. An apparatus for tracking a maximum efficiency operation point of a hydraulic turbine, comprising:
an information obtainment module, configured to obtain a speed adjustment quantity for the hydraulic turbine and a corresponding change in flow quantity, wherein a rotation speed of the hydraulic turbine is adjusted based on the speed adjustment quantity;
a turbine efficiency determination module, configured to determine a change ratio of flow quantity with regard to the speed adjustment quantity based on the speed adjustment quantity and the corresponding change in flow quantity; and
an adjustment determination module, configured to determine an adjustment manner in which the rotation speed is further adjusted to increase the turbine efficiency.

20. The apparatus of claim 19, wherein the information obtainment module is further configured to obtain a change of opening angle of a guide vane of the hydraulic turbine, and
wherein the change ratio determination module is further configured to: determine a change ratio of opening angle of a guide vane with regard to the speed adjustment quantity.

21. The apparatus of claim 19, further comprising:
a power comparison module, configured to compare an ordered power for the hydraulic turbine and a power at an absolute maximum efficiency point;
wherein the adjustment determination module is further configured to determine the adjustment manner based on a result of the comparing.

22. The apparatus of claim 19, further comprising:
a speed adjustment quantity changing module, configured to change a value of the speed adjustment quantity based on the change ratio.

23. The apparatus of claim 19, further comprising:
an initial speed determination module, configured to determine an initial rotation speed of the hydraulic turbine based on an ordered power for the hydraulic turbine, a water head, and a look-up table characterizing the relationship among a turbine rotation speed, the flow quantity, the water head and the turbine efficiency;
wherein the adjustment of a rotation speed of the hydraulic turbine is performed initially from the initial rotation speed.

24. The apparatus of claim 19, further comprising:
a speed adjustment module, configured to adjust the rotation speed of the hydraulic turbine in the determined adjustment manner.

* * * * *